May 31, 1949.   R. A. GILMAN   2,471,614
DEVICE FOR CONTROLLING THE TIGHTNESS
OF EXPANDED TUBE JOINTS
Filed June 1, 1948

RUSSELL A. GILMAN
INVENTOR.

BY
ATTORNEY

Patented May 31, 1949

2,471,614

UNITED STATES PATENT OFFICE 2,471,614

DEVICE FOR CONTROLLING THE TIGHTNESS OF EXPANDED TUBE JOINTS

Russell A. Gilman, San Gabriel, Calif.

Application June 1, 1948, Serial No. 30,368

1 Claim. (Cl. 64—30)

The present invention relates to a device for controlling the tightness of expanded tube joints in boilers, heat exchangers and various types of equipment in which such joints are employed.

Heretofore, it has been a common practice to determine when such a joint has attained the proper degree of tightness by judgment of the operator or the torque output of a motor. Since these are subject to variation in accordance with the skill of the operator, line fluctuations and other factors, leakage with consequent costly repairs are not infrequent.

It is, accordingly, an object of this invention to provide a device which can be relied upon to arrest expansion when the desired degree of joint tightness is attained.

Another object of the invention is to provide means for obtaining absolute accuracy in joint tightness by the installation of a device which can be produced at a very reasonable cost.

A further object of the invention is to provide a yielding expander drive connection which will enable production of uniformity of joint tightness throughout a given installation or under similar conditions of operation.

Still another object of the invention is to provide a device of the aforesaid character which can be readily mounted in operative association with conventional torque force applying and tube expanding equipment.

Other objects and advantages of the invention will become apparent as the description progresses.

In the accompanying drawing which illustrates one example of the construction and operative assembly of invention and wherein like numerals of reference designate corresponding parts throughout the several views.

Figure 1:
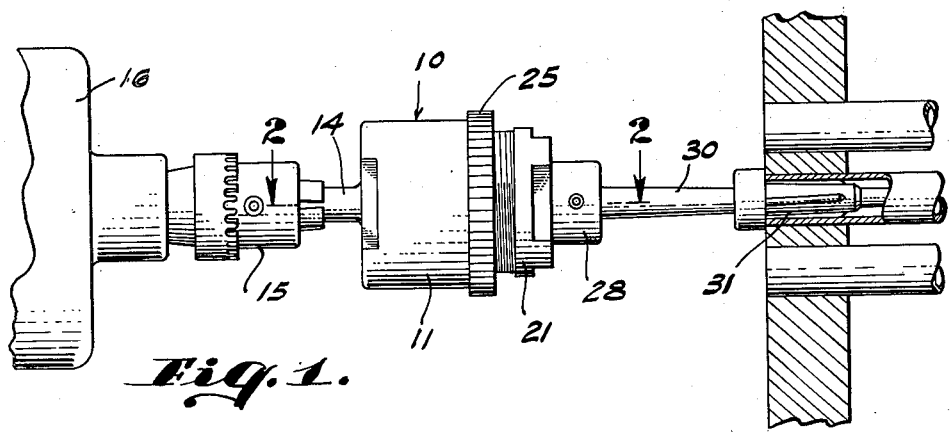
Figure 1 is a side elevational view of the device operatively associated with a drive motor and a tube expander.
Figure 2:
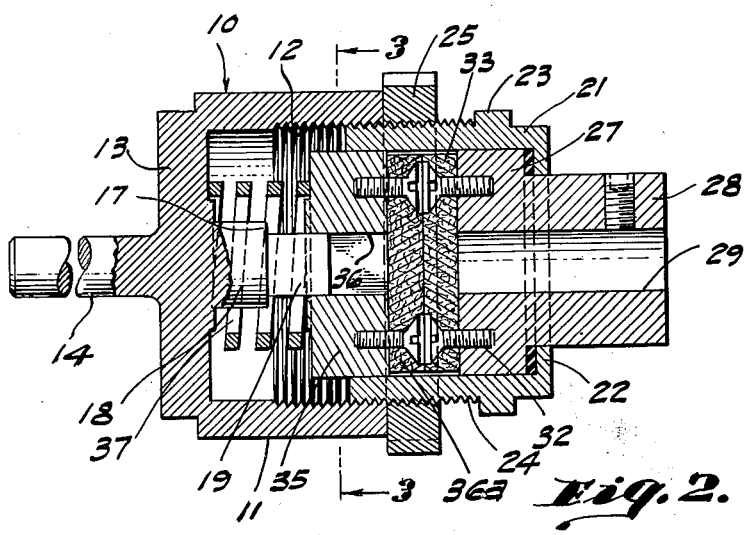
Figure 2 is a longitudinal section taken on line 2—2 of Figure 1.
Figure 3:
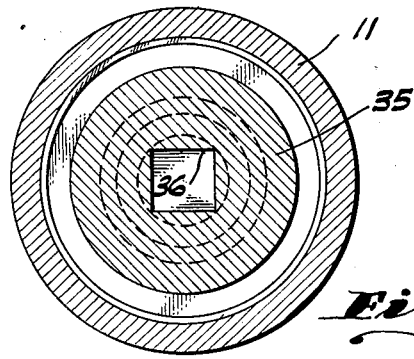
Figure 3 is a transverse section taken on line 3—3 of Figure 2.

Referring to the drawing, wherein is shown a preferred embodiment of the device, 10 generally designates the controller unit embodying, in the example illustrated, an outer case 11 having a cup shaped body provided with interior screw-threads 12 from its open end to a transverse wall 13 forming the closed end. Projecting axially outward of wall 13 is a stem 14 adapted for connection with the chuck 15 of a source of torque force, in the present case a motor 16. Interiorly of the case 10 is formed an axially projecting post 17 consisting of a round base 18 shouldered down to a head part of non-circular cross section, as the square head 19.

With outer case 11 is connected a complementary inner case 21 of essential cylindrical tubular structure provided at its outer end with an inwardly directed annular flange 22 forming a restricted opening. From its inner end to a shoulder 23 adjacent its outer end, case 21 has exterior screw threads 24 engaging threads 12 of the outer section. It will thus be seen that case 21 screws in and out of case 11 to afford relative axial adjustment of the cases. An annular ring or nut 25 has threaded engagement with the exterior of case 21 and by abutment with the open end of case 11, is operative to lock the cases in selectively adjusted relation.

Rotatably fitted within the outer end part of case 21 is a plate 27 having an external cylindrical contour conforming to that of the case and having an axially elongated boss protruding through the restricted opening to form a chuck 28 having a bore 29 adapted to receive therein the mandrel 30 of a roller expander 31. The inner end of plate 27 has fixed thereto, as by screws 32, a facing disk 33 of friction material in a plane normal to the axis of the device.

A second plate 35 of circular exterior configuration is slidably fitted in case 21 inwardly of plate 27 and has an axial non-circular opening 36 slidably receiving post head 19 therein. Plate 35 has a facing disk 36a at one end normally forced into engagement with disk 33 by a coiled spring 37 sleeved about post 17 and maintained under compression between the disk and wall 13 of outer case 11.

Thus, the device 10 constitutes a yielding clutch connection operative to release the expander from the torque applying force when the resistance of the expander attains a degree at which the spring pressed friction faces slip.

Since expanders of the type shown require no axial thrust during the expanding operation release, through the controller connection, is effected by the thrust action of spring 37 upon the frictionally engaged disks 33 and 36. Since the coefficient of friction of the facings remains constant, adjustment in accordance with tube size and material, tube sheet and such factors, is made by relative adjustment of the cases so that a load is imposed upon the meeting plates by the spring sufficient to cause breakage of the friction or other breakable joint between the plates when the desired tightness of tube joint is attained. At such time rotation of the expander is brought to a complete stop and excessive stressing is avoided. The expander can be conveniently detached by rotation in reverse direction.

It is advantageous to obtain utmost accuracy of control to measure the expansion of the first tube of an operation and set the spring load in accordance with an initial trial.

It is to be understood that the form of the invention herein shown and described is but one example of the same and that various changes as to the shape, size and arrangement of parts may be resorted to without departing from the spirit of the invention or the scope of the subjoined claim.

What I claim is:

In a device for controlling the tightness of an expanded tube joint, an outer cup-shaped case, means for connecting said case with a source of torque force, a tubular inner case axially adjustable within said outer case, means for locking said cases in adjusted relation, a tube expander, a driven plate rotatably mounted within said inner case and having means for positive driving connection with said tube expander, a driving plate axially slidable within said inner case, a post fixed to said outer case having a non-circular part extending into a non-circular bore in said driving plate for driving the latter, said driving and driven plates having frictionally engaging faces, and a compression spring sleeved about said post to force the driving plate against said driven plate under pressure predetermined to effect expansion of the tube and to automatically release the expander when desired tightness of joint is attained.

RUSSELL A. GILMAN.

REFERENCES CITED

The following references are of record in the file of this patent:

UNITED STATES PATENTS

| Number | Name | Date |
|---|---|---|
| 2,323,355 | Ricciardi | July 6, 1943 |
| 2,335,574 | Thompson et al. | Nov. 30, 1943 |